(12) United States Patent
Mahanthappa et al.

(10) Patent No.: US 8,834,743 B2
(45) Date of Patent: Sep. 16, 2014

(54) DICARBOXYLATE GEMINI SURFACTANT THAT FORMS A LYOTROPIC LIQUID CRYSTAL

(75) Inventors: Mahesh Kalyana Mahanthappa, Madison, WI (US); Gregory Paul Sorenson, Madison, WI (US); Keiva LaNee Coppage, Beloit, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 122 days.

(21) Appl. No.: 13/472,817

(22) Filed: May 16, 2012

(65) Prior Publication Data

US 2013/0306907 A1     Nov. 21, 2013

(51) Int. Cl.
*C09K 19/54* (2006.01)
*C09K 19/52* (2006.01)
*C07C 55/02* (2006.01)
*C07C 55/21* (2006.01)
*C07C 55/32* (2006.01)

(52) U.S. Cl.
USPC .......... 252/299.5; 252/299.01; 562/590; 562/596

(58) Field of Classification Search
CPC ........... C09K 19/0283; C09K 19/54; C09K 2019/525; C09K 2019/528; C07C 55/02; C07C 59/235; C07C 57/13; C07C 55/21; C07C 55/32
USPC .......... 252/299.01, 299.5; 562/590, 595, 596; 554/121
See application file for complete search history.

(56) References Cited

U.S. PATENT DOCUMENTS 6,046,292 A * 4/2000 Lochhead et al. ............ 526/321

| 7,090,788 | B2 | 8/2006 | Elliott |
| 7,604,129 | B2 | 10/2009 | Gin et al. |
| 2006/0096922 | A1 | 5/2006 | Gin et al. |
| 2007/0218371 | A1 | 9/2007 | Elliott et al. |
| 2008/0029735 | A1 | 2/2008 | Gin et al. |
| 2009/0173693 | A1 | 7/2009 | Gin et al. |
| 2012/0211424 | A1 | 8/2012 | Gabriel et al. |
| 2013/0190417 | A1* | 7/2013 | Mahanthappa et al. ...... 521/149 |

FOREIGN PATENT DOCUMENTS

WO      2004060531 A1    7/2004

OTHER PUBLICATIONS

Gin et al.; "Polymerized Lyotropic Liquid Crystal Assemblies for Membrane Applications", Macromol. Rapid Commun.; 29; pp. 367-389; (2008).
Hyde, Stephen T.; "Identification of Lyotropic Liquid Crystalline Mesophases"; from Chapter 16, Handbook of Applied Surface and Colloid Chemistry; vols. 1-2; John Wiley & Sons; pp. 299-332; (2002).
Sorenson et al.; "New Type of Membrane Material for Water Desalination Based on a Cross-Linked Bicontinuous Cubic Lyotropic Liquid Crystal Assembly"; J. Am. Chem. Soc.; 133; pp. 14928-14931; (2011).
Shearman, et al., "Ordered micellar and inverse micellar lyotropic phases," Liq. Cryst. 37:679-694 (2010).
Seddon, J. M., "Structure of the inverted hexagonal (HII) phase, and non-lamellar phase transitions of lipids," Biochim. Biophys. Acta 1031:1-69 (1990).

(Continued)

*Primary Examiner* — Sean C Wu
(74) *Attorney, Agent, or Firm* — Cantor Colburn LLP

(57) ABSTRACT

Aliphatic dicarboxylate Gemini surfactants and lyotropic liquid crystal compositions formed thereby are disclosed. The Gemini surfactants are capable of robustly forming Q phase morphologies over broad ranges of temperature and concentration.

16 Claims, 9 Drawing Sheets

(56) References Cited

OTHER PUBLICATIONS

Dix, et al., "Lyotropic and interfacial behavior of an anionic gemini surfactant," J. Colloid Interfac. Sci. 296:762-765 (2006).

Pindzola, et al., "Cross-Linked Normal Hexagonal and Bicontinuous Cubic Assemblies via Polymerizable Gemini Amphiphiles," J. Am. Chem. Soc. 125:2940-2949 (2003).

Matsen, et al., "Origins of Complex Self-Assembly in Block Copolymers," Macromolecules 29:7641-7644 (1996).

Shearman, et al., "Calculations of and evidence for chain packing stress in inverse lyotropic bicontinuous cubic phases," Langmuir 23:7276-7285 (2007).

Menger, et al., "Gemini Surfactants," Angew. Chem. Int. Ed. 39:1906-1920 (2000).

Svenson, S., "Self-assembly and self-organization: Important processes, but can we predict them?," J. Disper. Sci. Tech. 25:101-118 (2004).

Israelachvili, J. N., Intermolecular and Surface Forces, 2nd ed.; Academic Press London, (1991).

Fairhurst, et al., "Lyotropic surfactant liquid crystals," in Handbook of Liquid Crystals, Demus, D.; Goodby, J. W.; Gray, G. W.; Spiess, H. W.; Vill, V., Eds. Weinheim: Wiley-VCH, vol. 3, pp. 341-392 (1998).

Leal, et al., "Highly Efficient Gene Silencing Activity of siRNA Embedded in a Nanostructured Gyroid Cubic Lipid Matrix," J. Am. Chem. Soc. 132:16841-16847 (2010).

Rummel, et al., "Lipidic cubic phases: new matrixes for the three-dimensional crystallization of membrane proteins," J. Struct. Biol. 121:82-91 (1998).

Johansson, et al., "Membrane protein crystallization from lipidic phases," Curr. Opin. Struct. Biol. 19:372-378 (2009).

Kerr, et al., "New Type of Li Ion Conductor with 3D Interconnected Nanopores via Polymerization of a Liquid Organic Electrolyte-Filled Lyotropic Liquid-Crystal Assembly," J. Am. Chem. Soc. 131:15972-15973 (2009).

Zhou, et al., "New Type of Membrane Material for Water Desalination Based on a Cross-Linked Bicontinuous Cubic Lyotropic Liquid Crystal Assembly," J. Am. Chem. Soc. 129:9574-9575 (2007).

Kato, et al., "Functional liquid-crystalline assemblies: Self-organized soft materials," Angew. Chem., Int. Ed. 45:38-68 (2006).

Hoag, et al., "Cross-linkable Liquid Crystal Monomers Containing 1,3-Diene Tail Systems," Macromolecules 33 (23):8549-8558 (2000).

Pindzola, et al., "Lyotropic Liquid-Crystalline Phase Behavior of Some Alkyltrimethylphosphonium Bromides," Langmuir 16:6750-6753 (2000).

Pfeffer, et al., "Alpha Anions of Carboxylic-Acids. 2. Formation and Alkylation of Alpha-Metalated Aliphatic Acids," Journal of Organic Chemistry 37:451 (1972).

Alami, et al., "Alkanediyl-alpha,omega-Bis(Dimethylalkylammonium Bromide) Surfactants. 2. Structure of the Lyotropic Mesophases in the Presence of Water," Langmuir 9:940-944 (1993).

Brun, et al., "The Fraction of Associated Counterions and Singly Dispersed Amphiphiles in Micellar Systems from Ion-Exchange Membrane Electrode Measurements," J. Colloid Interfac. Sci. 63:590-592 (1978).

Hentze, et al., "Lyotropic Mesophases of Poly(ethylene oxide)-b-poly(butadiene) Diblock copolymers and Their Cross-Linking to Generate Ordered Gels," Macromolecules 32:5803-5809 (1999).

Diamant, et al., "Models of Gemini Surfactants," In Surfactant Science Series, Zana, R.; Xia, J., Eds.; Marcel Dekker, Inc.: New York; vol. 117, p. 37 (2004).

Hatakeyama, et al., "Nanoporous, Bicontinuous Cubic Lyotropic Liquid Crystal Networks via Polymerizable Gemini Ammonium Surfactants," Chem. Mater. 22:4525-4527 (2010).

Han, Y., et al., "A tri-continuous mesoporous material with a silica pore wall following a hexagonal minimal surface," Nature Chem. 1:123-127 (2009).

\* cited by examiner

DICARBOXYLATE GEMINI SURFACTANT THAT FORMS A LYOTROPIC LIQUID CRYSTAL

STATEMENT REGARDING FEDERALLY SPONSORED RESEARCH & DEVELOPMENT

This invention was made with government support under 0902067 awarded by the National Science Foundation. The government has certain rights in the invention.

FIELD OF THE INVENTION

The field of the invention relates generally to anionic Gemini surfactants that form a lyotropic liquid crystal in an aqueous composition.

BACKGROUND OF THE INVENTION

Lyotropic liquid crystal (LLC) assemblies have garnered widespread attention in disparate areas of chemistry, by virtue of their utility in highly selective chemical separations such as water desalination and selective ion-transporting membranes, as templates for mesoporous inorganic materials, as media for biophysical studies of transmembrane proteins ("cubic lipidic phases"), and as therapeutic nucleic acid delivery vehicles. See, e.g., (1) Kato, T.; Mizoshita, N.; Kishimoto, K. *Angew. Chem. Int. Ed.* 2006, 45, 38; (2) Zhou, M.; Nemade, P. R.; Lu, X.; Zeng, X.; Hatakeyama, E. S.; Noble, R. D.; Gin, D. L. *J. Am. Chem. Soc.* 2007, 129, 9574; (3) Kerr, R. L.; Miller, S. A.; Shoemaker, R. K.; Elliott, B. J.; Gin, D. L. *J. Am. Chem. Soc.* 2009, 131, 15972; (4) Hentze, H. P.; Kramer, E.; Berton, B.; Förster, S.; Antonietti, M.; Dreja, M. *Macromolecules* 1999, 32, 5803; (5) Johansson, L. C.; Woehri, A. B.; Katona, G.; Engstroem, S.; Neutze, R. *Curr. Opin. Struct. Biol.* 2009, 19, 372; (6) Rummel, G.; Hardmeyer, A.; Widmer, C.; Chiu, M. L.; Nollert, P.; Locher, K. P.; Pedruzzi, I.; Landau, E. M.; Rosenbusch, J. P. *J. Struct. Biol.* 1998, 121, 82; and (7) Leal, C.; Bouxsein, N. F.; Ewert, K. K.; Safinya, C. R. *J. Am. Chem. Soc.* 2010, 132, 16841. LLCs form by the concentration-dependent supramolecular self-organization of amphiphilic molecules in water or another polar solvent into soft materials having distinct hydrophilic and hydrophobic nanoscale domains (~7 to 100 Å) with long-range periodic order. See (8) Fairhurst, C. E.; Fuller, S.; Gray, J.; Holmes, M. C.; Tiddy, G. J. T. In *Handbook of Liquid Crystals*, Demus, D.; Goodby, J. W.; Gray, G. W.; Spiess, H. W.; Vill, V., Eds.; Wiley-VCH: Weinheim, 1998; Vol. 3, pp 341. LLCs typically exhibit ordered phases such as lamellae ($L_\alpha$), bicontinuous cubic (Q; e.g., double gyroid, double diamond, and "Plumber's Nightmare"), hexagonally packed cylinders (H), and discontinuous cubic (I; e.g., body-centered cubic) morphologies. See (9) Shearman, G. C.; Tyler, A. I. I.; Brooks, N. J.; Templer, R. H.; Ces, O.; Law, R. V.; Seddon, J. M. *Liq. Cryst.* 2010, 37, 679. High symmetry Q-phase assemblies, exemplified by the double gyroid (G) phase, are particularly desirable for membrane applications by virtue of their interpenetrating hydrophilic and hydrophobic domains that percolate over macroscopic lengthscales with tunable nanopore diameters (~7 to 50 Å) and well-defined nanopore functionalities. Q-phases typically exist only in limited polar solvent concentration and temperature phase windows, due to the fact that their interfaces substantially deviate from a constant mean interfacial curvature. See (10) Pindzola, B. A.; Gin, D. L. *Langmuir* 2000, 16, 6750; (11) Matsen, M. W.; Bates, F. S. *Macromolecules* 1996, 29, 7641; and (12) Shearman, G. C.; Khoo, B. J.; Motherwell, M. L.; Brakke, K. A.; Ces, O.; Conn, C. E.; Seddon, J. M.; Templer, R. H. *Langmuir* 2007, 23, 7276. While "critical packing parameter" models enable correlations of amphiphile structure with the formation of constant mean curvature $L_\alpha$, H, and I phases, these models fail to provide reliable and general molecular design criteria for amphiphiles that form non-constant mean curvature Q phases. See (13) Israelachvili, J. N. *Intermolecular and Surface Forces*, $2^{nd}$ ed.; Academic Press: London, 1991; (14) Svenson, S. *J. Dispersion Sci. Technol.* 2004, 25, 101; and (15) Diamant, H.; Andelman, D. In *Surfactant Science Series*, Zana, R.; Xia, J., Eds.; Marcel Dekker, Inc.: New York, 2004; Vol. 117, pp 37. Gin and co-workers recently reported that small molecule quaternary ammonium, phosphonium, and imidazolium Gemini amphiphiles, derived from dimerizing single-tail surfactants with an alkyl spacer through the ionic headgroup, exhibit a greater tendency to form G phase LLCs in water. See (16) Alami, E.; Levy, H.; Zana, R.; Skoulios, A. *Langmuir* 1993, 9, 940; (17) Hatakeyama, E. S.; Wiesenauer, B. R.; Gabriel, C. J.; Noble, R. D.; Gin, D. L. *Chem. Mater.* 2010, 22, 4525; (18) Pindzola, B. A.; Jin, J.; Gin, D. L. *J. Am. Chem. Soc.* 2003, 125, 2940; (19) Gin, D. L.; Zhou, M.; Noble, R. D.; Bara, J. E.; Kerr, R. L.; Wiesenauer, B. R. US Patent Appl 2009/0173693, 2009; and (20) Menger, F. M.; Keiper, J. S. *Angew. Chem. Int. Ed.* 2000, 39, 1906. The notion that Gemini architectures universally form bicontinuous cubic LLC morphologies remains an untested amphiphile design principle.

BRIEF DESCRIPTION OF THE INVENTION

Briefly, therefore, the present invention is directed to a lyotropic liquid crystal composition. The LLC composition comprises a polar solvent such as water and an anionic Gemini surfactant, the anionic Gemini surfactant comprising at least one carboxylate moiety. The anionic Gemini surfactant forms a triply periodic phase over a range of concentrations from $C_i$ to $C_{ii}$ wherein the difference between $C_i$ and $C_{ii}$ is at least 10 weight percent and over a range of temperatures from $T_i$ to $T_{ii}$ wherein the difference between $T_i$ and $T_{ii}$ is at least 40° C.

The present invention is further directed to a lyotropic liquid crystal composition. The LLC composition comprises a polar solvent such as water at a concentration of at least 10 weight percent; and an anionic Gemini surfactant at a concentration of least 30 weight percent, the anionic Gemini surfactant having the following structure:

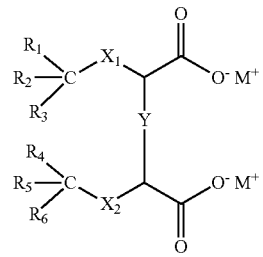

Herein $X_1$ and $X_2$ are each independently a substituted or unsubstituted aliphatic moiety having between four and 30 carbon atoms or a substituted or unsubstituted aryl-aliphatic moiety having between four and 30 carbon atoms; Y is a connecting moiety selected from the group consisting of a branched or unbranched hydrocarbyl moiety, a substituted or unsubstituted aryl or heteroaryl moiety, and a hydrophilic moiety; M is a counterion; and $R_1$ through $R_6$ are each independently selected from the group consisting of hydrogen, fluoride, chloride, and bromide.

The present invention is still further directed to an anionic Gemini surfactant has the following structure:

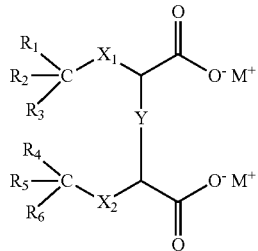

Herein $X_1$ and $X_2$ are each independently a substituted or unsubstituted aliphatic moiety having between four and 30 carbon atoms or a substituted or unsubstituted aryl-aliphatic moiety having between four and 30 carbon atoms; Y is a connecting moiety selected from the group consisting of a branched or unbranched hydrocarbyl moiety, a substituted or unsubstituted aryl or heteroaryl moiety, and a hydrophilic moiety; M is a counterion; and $R_1$ through $R_6$ are each independently selected from the group consisting of hydrogen, fluoride, chloride, and bromide.

DETAILED DESCRIPTION OF THE EMBODIMENT(S) OF THE INVENTION

Figure 1A:
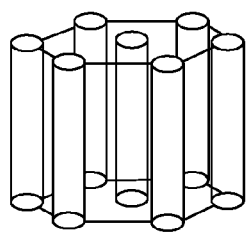
FIGS. 1A through 1F are illustrations of the observed LLC morphologies formed by Gemini surfactants: hexagonal ($H_I$) with constant positive mean curvature (FIG. 1A), lamellar ($L_\alpha$) with flat interfaces (FIG. 1B), Double Gyroid ($G_I$) (FIG. 1C), Double Diamond ($D_I$) (FIG. 1D), Primitive ($P_I$) (FIG. 1E), and tetracontinuous hexagonal (FIG. 1F) that require substantial positive and negative deviations from constant mean curvature.
Figure 1B:
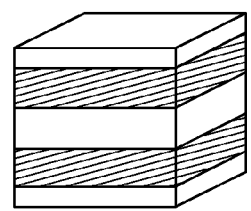

The present disclosure is directed to materials that form lyotropic liquid crystals. Lyotropic liquid crystals comprise materials that form phases having long-range translational order induced by the addition of a solvent. Stated another way, lyotropic liquid crystals comprise ordered phases in solvent, in which the structurally periodic phase that exists in the liquid crystal composition varies as a function of concentration of the surfactant in the solvent system, temperature, and pressure. A subset of these phases can be described as being triply periodic, since the phases comprise structures that repeat in three dimensions. LLC phases may be described in a phase diagram in which the X-axis (abscissa) is concentration and the Y-axis (ordinate) is temperature. The liquid crystalline phase that generally forms at low surfactant concentrations is the 'micellar cubic' or 'discontinuous cubic' phase comprising spherical micelles and which may be denoted by the symbol $I_1$. This is a viscous, optically non-birefringent phase in which the micelles are arranged on a cubic lattice. At higher concentrations, in general, the cylindrical micelles of indefinite length form and are arranged on a two-dimensional hexagonal lattice with long-range periodic order. This lyotropic liquid crystalline phase is known as the 'hexagonal phase,' or more specifically the "normal" hexagonal phase and is generally denoted by the symbol $H_I$. At higher concentrations, the 'lamellar phase' generally forms. This phase is denoted by the symbol $L_\alpha$. This phase consists of surfactant molecules arranged in bilayer sheets separated by layers of water. Some materials may form an intermediate phase at concentrations generally between those concentrations at which hexagonal and lamellar phases form. Some intermediate phases may be referred to as a bicontinuous cubic phases or Q-phases. Bicontinuous cubic phases include double gyroid phase ($G_I$, space group #230), the single gyroid phase (space group #214), the double diamond phase (space group #224), and the primitive cubic phase (space group #229). See FIGS. 1A through 1F. See also Seddon, J. M. Biochimica et Biophysica Acta, 1990, 1031, 1-69 and V. Luzzati, R. Vargas, P. Mariani, A. Gulik, H. Delacroix, J. Mol. Biol. 229 (1993) 540. FIGS. 1A through 1F depicts the Hexagonal ($H_I$) (FIG. 1A), Lamellar ($L_\alpha$) (FIG. 1B), and Double Gyroid ($G_I$) (FIGS. 1C through 1E) phases. FIG. 1F depicts a tetracontinuous hexaganal phase, which may be prepared using anionic Gemini surfactants of the present invention. The various phases that a lyotropic liquid crystal may assume are generally discussed as a function of concentration; however, phase transitions may occur as the temperature or pressure of the system increases. Surfactant concentrations at which a double gyroid phase, for example, may form at lower temperatures, e.g., 20° C., may shift or the range may narrow as the temperature of the system increases, e.g., to 100° C.

The present disclosure is directed to anionic Gemini surfactants comprising at least one carboxylate moiety, preferably two carboxylate moieties, that robustly form lyotropic liquid crystals upon the addition of a solvent. The anionic Gemini surfactants of the present disclosure form three dimensional multiply continuous lyotropic phases over broad ranges of concentration and temperature. These three dimensional multiply continuous phases encompass bicontinuous cubic phases known in the art, for example, the double gyroid phase (space group #230), single gyroid (space group #214), double diamond phase (space group #224), or primitive cubic phase (space group #229). The three dimensional multiply continuous phases of the present disclosure additionally encompass tetracontinuous phases, such as a novel hexagonal tetracontinuous phase with percolating pores in three dimensions. This phase is comprised of three distinct, interpenetrating, and unconnected hydrophobic networks each having P6$_3$/mmc (space group #194) symmetry to yield an overall hydrophobic network structure with P6$_3$/mcm symmetry (space group #193), in which the voids are filled with solvent. This tetracontinuous phase is related yet distinct from that described previously in connection with inorganic mesoporous silicates (Han, Y; Zhang, D.; Chng, L. L.; Sun, J.; Zhao, L.; Zou, X.; Ying, J. Y. *Nature Chem.*, 2009, 1, 123-127).

The anionic Gemini surfactants additionally comprise multiple, preferably two, hydrophobic tail groups, the tail groups being linked via a connecting moiety, generally bonded to the carbon alpha to the headgroups. An anionic Gemini surfactant according to the present disclosure may have the following structure:

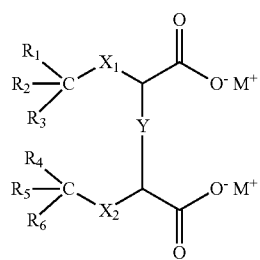

Structure (I)

In structure (I), $X_1$ and $X_2$ are each independently a substituted or unsubstituted aliphatic moiety having between four and 30 carbon atoms or a substituted or unsubstituted aryl-aliphatic moiety having between four and 30 carbon atoms, preferably between four and 20 carbon atoms, even more preferably between four and 16 carbon atoms, such as between four and nine carbon atoms. The $X_1$ and $X_2$ aliphatic groups may be saturated or may comprise unsaturated moieties, such as alkenyl or alkynyl. That is, the $X_1$ and $X_2$ aliphatic groups may comprise one or more carbon-to-carbon double bonds and/or one or more carbon-to-carbon triple bonds. Additionally, the $X_1$ and $X_2$ aliphatic groups may comprise cyclic moieties, i.e., cycloalkyl, either within the main carbon chain or branched therefrom. $X_1$ and $X_2$ aryl-aliphatic groups may comprise aryl moieties either within the main carbon chain or branched therefrom. The aryl moieties may comprise two branching aliphatic moieties, which may be positioned ortho, meta, or para. The $X_1$ and $X_2$ aliphatic groups and aryl-aliphatic groups may comprise branching moieties, e.g., alkyl, alkenyl, trialkylsilyl, phenyl, and substituted phenyl. The $X_1$ and $X_2$ aliphatic groups and aryl-aliphatic groups may comprise hydrocarbyls (i.e., the entirety of the aliphatic group or aryl-aliphatic group comprises only carbon-carbon or carbon-hydrogen bonds) or the aryl and aliphatic groups may comprise heteroatom substituents, such as halide atoms (e.g., fluoride, chloride, and bromide) or other heteroatoms, such as oxygen, nitrogen, and sulfur within, e.g., the aryl moiety, in heteroaryl groups. In some embodiments, the aliphatic groups contain at least two fluoride atoms, such as at least four fluoride atoms. In some embodiments, the aliphatic groups are perfluorinated, meaning that all hydrogen atoms along the carbon chain are replaced with fluoride atoms.

In some preferred embodiments, the $X_1$ and $X_2$ aliphatic and aryl-aliphatic moieties comprise at least one carbon-to-carbon double bond. In some embodiments, each of the $X_1$ and $X_2$ aliphatic and aryl-aliphatic moieties comprise at least two carbon-to-carbon double bonds. In some embodiments, the multiple carbon-to-carbon double bonds may be conjugated alkenes. In some embodiments, the multiple carbon-to-carbon double bonds may be non-conjugated, for example, separated by at least one intervening methylene. Anionic Gemini surfactants comprising long, saturated aliphatic chains tend to have a high degree of crystallinity, which may shorten the concentration ranges over which the surfactants form three dimensional multiply continuous phases. Double bonded moieties advantageously disrupt the crystal-forming tendencies of long aliphatic chain surfactants, thereby extending the three dimensional multiply continuous phase concentration range.

In structure (I), $R_1$ through $R_6$ are each independently selected from the group consisting of hydrogen, fluoride, chloride, and bromide. In some preferred embodiments, each of $R_1$ through $R_6$ is hydrogen. In embodiments wherein the $X_1$ and $X_2$ aliphatic moieties are perfluorinated, each of $R_1$ through $R_6$ is fluoride.

Figure 2A:
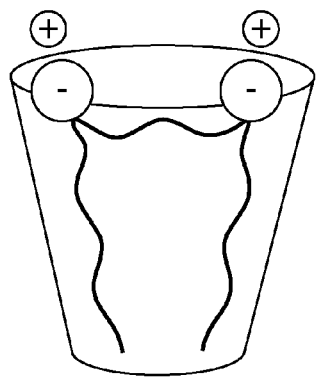
FIGS. 2A through 2C are illustrations of the variety of possible curvatures adopted by Gemini surfactants with flexible hydrophobic alkyl spacers.
Figure 2B:
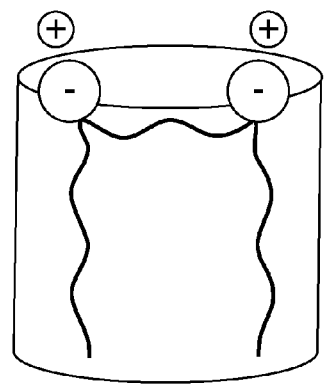
Figure 2C:
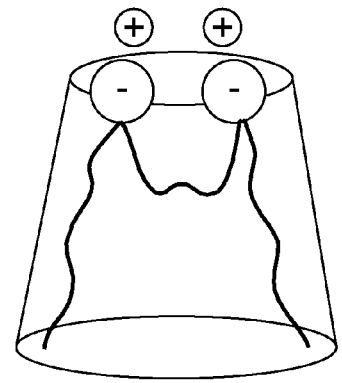

In structure (I), Y is a connecting moiety. In some embodiments, Y comprises an aliphatic moiety, which may be substituted or unsubstituted and may be branched or unbranched, the aliphatic moiety comprising between three carbon atoms and 20 carbon atoms, such as between about three carbon atoms and 8 carbon atoms. The aliphatic connecting moiety may be saturated or may comprise unsaturated moieties, such as alkenyl or alkynyl. That is, the aliphatic connector may comprise one or more carbon-to-carbon double bonds and/or one or more carbon-to-carbon triple bonds. In some embodiments, Y comprises unsaturated carbon-to-carbon bonds. Additionally, the aliphatic connector may comprise cyclic moieties, i.e., cycloalkyl, either within the main carbon chain or branched therefrom. In some preferred embodiments, Y comprises the branched or unbranched hydrocarbyl moiety comprising between three carbon atoms and 20 carbon atoms, such as between three carbon atoms and 12 carbon atoms, such as between three carbon atoms and eight carbon atoms. A hydrocarbyl moiety comprises only carbon-carbon or carbon-hydrogen bonds. Aliphatic and hydrocarbyl connecting moieties provide a large degree of flexibility to the connection. Flexible hydrophobic spacers confer conformational flexibility that enables the surfactant to accommodate the substantial deviations from constant mean interfacial curvature required for G-phase stabilization. See FIGS. 2A through 2C for illustrations of the curvatures afforded by flexible aliphatic connecting moieties, including positive curvature (FIG. 2A), flat curvature (FIG. 2B), and negative curvature (FIG. 2C).

In some embodiments, Y comprises a substituted or unsubstituted aryl or heteroaryl moiety. An aryl moiety may impart rigidity to the connecting moiety. Rigid moieties may stabilize or destabilize various LLC phases, and thus allow manipulation of the phase stability. Aryl group substituents may include fluoride, chloride, bromide, methyl, ethyl, propyl, butyl hydroxyl, alkoxy generally having from one to four carbon atoms, nitro, and amines having the general structure $NH_xR_{2-x}$ wherein X has a value from 0 to 2, and R may be an alkyl having from one to four carbon atoms. A heteroaryl group may be selected from among pyridine, pyrazole, furan, pyrrole, imidazole, imidazoliums, triazole, and triazoliums.

Herein, the aryl moiety may comprise one or two aliphatic chains, which are bonded to the alpha carbons of the carboxylate. The aliphatic chains extending from the aryl moiety generally have from 0 to five carbon atoms, from one to five carbon atoms, or from one to three carbon atoms. The aliphatic chains may be located ortho, meta, or para to each other around the aromatic ring. In some embodiments, such a connecting moiety may have the structure:

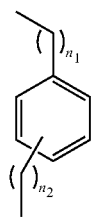

wherein $n_1$ and $n_2$ are integers, each having an independent value between 0 and five, between one and five, or between one and three. The aliphatic chains herein may be located ortho, meta, or para to each other around the aromatic ring.

In some embodiments, Y comprises heteroatoms, such as oxygen, that increase the hydrophilicity of the connecting moiety. The hydrophilic moiety enables manipulation of the phase stability by manipulating curvative at the interface between hydrophobic and hydrophilic domains. In some embodiments, the hydrophilic moiety may comprise a poly-alkylether moiety, for example, a short polyethylene oxide or polypropylene oxide, generally having from 1 to 4 repeat units. In some preferred embodiments, the hydrophilic moiety has the structure:

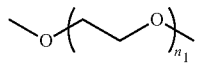

wherein $n_1$ is an integer having a value between one and four, such as one or two.

In some embodiments, the hydrophilic connecting moiety contains hydroxyl or alkoxy moieties. Such a connecting moiety may have the structure:

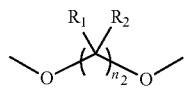

wherein $R_1$ and $R_2$ are each independently hydrogen, hydroxyl, alkyl having from one to five carbon atoms; and $n_2$ is an integer having a value between one and ten, such as between one and six, or between one and three. One such hydrophilic moiety may have the structure:

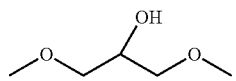

In structure (I), M is a counterion. Empirical results to date indicate that the counterion in the anionic carboxylate Gemini surfactants of the present invention also plays a role in enhancing the flexibility and the curvature of the surfactant. Effective charge neutralization through counterion association allows the alkyl spacer between the carboxylate headgroups to relax, enabling the Gemini surfactant to adopt a wider range of interfacial curvatures over a broader range of headgroup hydration levels to stabilize the non-constant mean curvature $G_I$-phase. M counterions may be selected from among lithium ion; sodium ion; potassium ion; cesium ion; magnesium ion; calcium ion; zinc ion; ammonium ion; alkylammonium ion having the structure $H_xR_{4-x}N^+$ wherein x is an integer having a value of 0 through 4 and R is selected from the group consisting of methyl, ethyl, propyl, butyl, and combinations thereof; tetrakis(hydroxymethyl)phosphonium ion; tetramethylphosphonium ion; choline; imidazolium; and bis(quaternary ammonium) ion. Alkylammonium ions may include, for example, methylammonium ion, dimethylammonium ion, trimethylammonium ion, ethylammonium ion, diethylammonium ion, triethylammonium ion, tetramethylammonium ion, and tetraethylammonium ion. Preferred M counterions include sodium ion, potassium ion, and tetramethylammonium ion.

In some embodiments of the present disclosure, the anionic Gemini surfactant has the following structure (II):

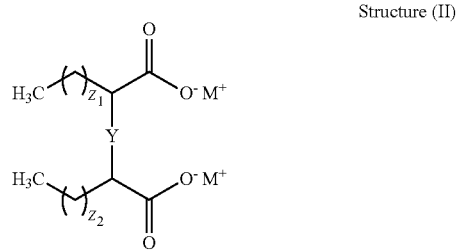

Structure (II)

In structure (II), $Z_1$ and $Z_2$ are integers, each independently having a value between four and twenty; preferably between four and 12, such as between seven and 11, such as seven. Y is the connecting moiety, and M is the counterion. Each of Y and M are as defined above in connection with structure (I).

In some embodiments, the anionic Gemini surfactant has the following structure (III):

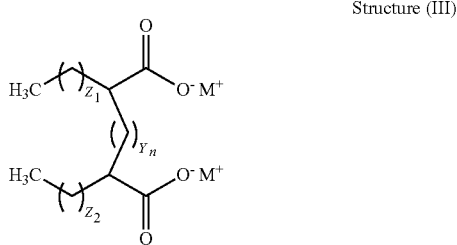

Structure (III)

In structure (III), $Z_1$ and $Z_2$ are integers, each independently having a value between four and twenty; preferably between four and 12, such as between seven and 11, such as seven. $Y_1$ is an integer having a value between two and 12, preferably between four and eight. M counterions may be selected from among lithium ion; sodium ion; potassium ion; cesium ion; magnesium ion; calcium ion; zinc ion; ammonium ion; alkylammonium ion having the structure $H_xR_{4-x}N^+$ wherein x is an integer having a value of 0 through 4 and R is selected from the group consisting of methyl, ethyl, propyl, butyl, and combinations thereof; tetrakis(hydroxymethyl) phosphonium ion; tetramethylphosphonium ion; choline;

imidazolium; and bis(quaternary ammonium)ion. Alkylammonium ions may include, for example, methylammonium ion, dimethylammonium ion, trimethylammonium ion, ethylammonium ion, diethylammonium ion, triethylammonium ion, tetramethylammonium ion, and tetraethylammonium ion. Preferred M counterions include sodium ion, potassium ion, and tetramethylammonium ion.

In some preferred embodiments, the anionic Gemini surfactant has the structure (III) in which $Z_1$ and $Z_2$ are seven, $Y_1$ is four, and M is sodium ion. The surfactant is sodium docosane-9,14-dicarboxylate ("Na-74"). In some preferred embodiments, the anionic Gemini surfactant has the structure (III) in which $Z_1$ and $Z_2$ are seven, $Y_1$ is six, and M is sodium ion. The surfactant is sodium tetracosane-9,16-dicarboxylate ("Na-76"). In some preferred embodiments, the anionic Gemini surfactant has the structure (III) in which $Z_1$ and $Z_2$ are seven, $Y_i$ is four, and M is potassium ion. The surfactant is potassium docosane-9,14-dicarboxylate ("K-74"). In some preferred embodiments, the anionic Gemini surfactant has the structure (III) in which $Z_1$ and $Z_2$ are seven, $Y_1$ is four, and M is tetramethylammonium ion. The surfactant is tetramethylammonium docosane-9,14-dicarboxylate ("NMe4-74"). In some preferred embodiments, the anionic Gemini surfactants has the structure (III) in which $Z_1$ and $Z_2$ are nine, $Y_1$ is four, and M is sodium ion. The surfactant is sodium hexacosane-11,16-dicarboxylate ("Na-94"). In some preferred embodiments, the anionic Gemini surfactants has the structure (III) in which $Z_1$ and $Z_2$ are nine, $Y_1$ is six, and M is sodium ion. The surfactant is sodium octacosane-11,18-dicarboxylate ("Na-96").

The present invention is further directed to a lyotropic liquid crystal composition prepared by combining an anionic Gemini surfactant and a suitable polar solvent. Suitable polar solvents include water, ethylene glycol, diethylene glycol, glycidol, 2-butene-1,4-diol, propanediol, glycerol, formamide, N-methylformamide, N-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, ethanolammonium acetate, 1-ethyl-3-methyl-imidazolium acetate, 1-ethyl-3-methylimidazolium bis(trifluoromethylsulfonyl)imide, 1-ethyl-3-methylimidazolium tetrafluoroborate, or any combination thereof, with water being particularly preferred. The lyotropic liquid crystal composition of the present invention prepared by combining an anionic Gemini surfactant and a polar solvent are capable of robustly forming a variety of lyotropic liquid crystal phases. The anionic Gemini surfactants of the present disclosure are capable of forming triply periodic phases over a broad range of concentrations and temperatures. These triply periodic phases encompass bicontinuous cubic phases known in the art, for example, the double gyroid phase (space group #230), single gyroid phase (space group #214), double diamond phase (space group #224), or primitive cubic phase (space group #229). See Seddon, J. M. *Biochimica et Biophysica Acta,* 1990, 1031, 1-69 and V. Luzzati, R. Vargas, P. Mariani, A. Gulik, H. Delacroix, J. Mol. Biol. 229 (1993) 540. The triply periodic phases of the present disclosure additionally encompass tetracontinuous phases, such as a novel hexagonal tetracontinuous phase with percolating pores in three dimensions. The pores in these materials may range from 5-100 Å.

In some embodiments, the anionic Gemini surfactant forms a triply periodic phase such as a double gyroid phase (space group #230), single gyroid (space group #214), double diamond phase (space group #224), primitive cubic phase (space group #229), or hexagonal tetracontinuous phase over a range of concentrations from $C_i$ to $C_{ii}$ wherein the difference between $C_i$ and $C_{ii}$ is at least 10 weight percent, at least 12 weight percent, at least 14 weight percent, at least 16 weight percent, at least 18 weight percent, or at least 20 weight percent. Advantageously, the triply periodic phase is stable over a broad range of temperatures from $T_i$ to $T_{ii}$ wherein the difference between $T_i$ and $T_{ii}$ is at least 40° C., at least 45° C., at least 50° C., at least 55° C., at least 60° C., at least 65° C., at least 70° C., at least 75° C., or at least 80° C.

According to empirical results to date, the anionic Gemini surfactant generally forms a triply periodic phase at concentrations of at least 30 weight percent, at least 40 weight percent, at least 45 weight percent, or at least 50 weight percent. At these concentrations, the lyotropic liquid crystal phase generally transitions from hexagonal to Q-phase. At anionic Gemini surfactant concentrations generally no greater than 90 weight percent, no greater than 85 weight percent, or no greater than 80 weight percent, the lyotropic liquid crystal phase generally transitions from Q-phase to lamellar. The concentrations at which these phase transitions occur depend upon multiple factors, in addition to concentration. These factors include the structure of the anionic Gemini surfactant, the identity of the counterion, the temperature of the system, the pressure of the system, and the presence and identity of co-solvents, if any are added to the system. In view thereof, the concentrations of the phase transition may vary significantly from one surfactant to another. The anionic Gemini surfactants comprising at least one, and preferably two, carboxylate groups of the present disclosure advantageously provide robust LLC systems exhibiting triply periodic phases over broad concentration and temperature ranges.

The solvent concentration is generally at least 5 weight percent, preferably at least 10 weight percent, in order to prepare a lyotropic liquid crystal. At concentrations less than about 5 weight percent or less than about 10 weight percent, the anionic Gemini surfactant generally forms a crystalline phase. Suitable polar solvents include water, ethylene glycol, diethylene glycol, glycidol, 2-butene-1,4-diol, propanediol, glycerol, formamide, N-methylformamide, N,-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, and ethanolammonium acetate. In preferred embodiments, the solvent is water. The solvent may include a co-solvent, generally at a low concentration, such as less than 10 weight percent, preferably less than 5 weight percent. In general, a co-solvent may exist in the solvent system when the Gemini surfactant is pre-dissolved in a co-solvent, and the Gemini surfactant is introduced into the polar solvent in a co-solvent solution. Co-solvents which may be used to pre-dissolve the Gemini surfactants include methanol, ethanol, acetone, tetrahydrofuran, diethyl ether, glycerol, ethylene glycol, and dimethylformamide.

Figure 3:
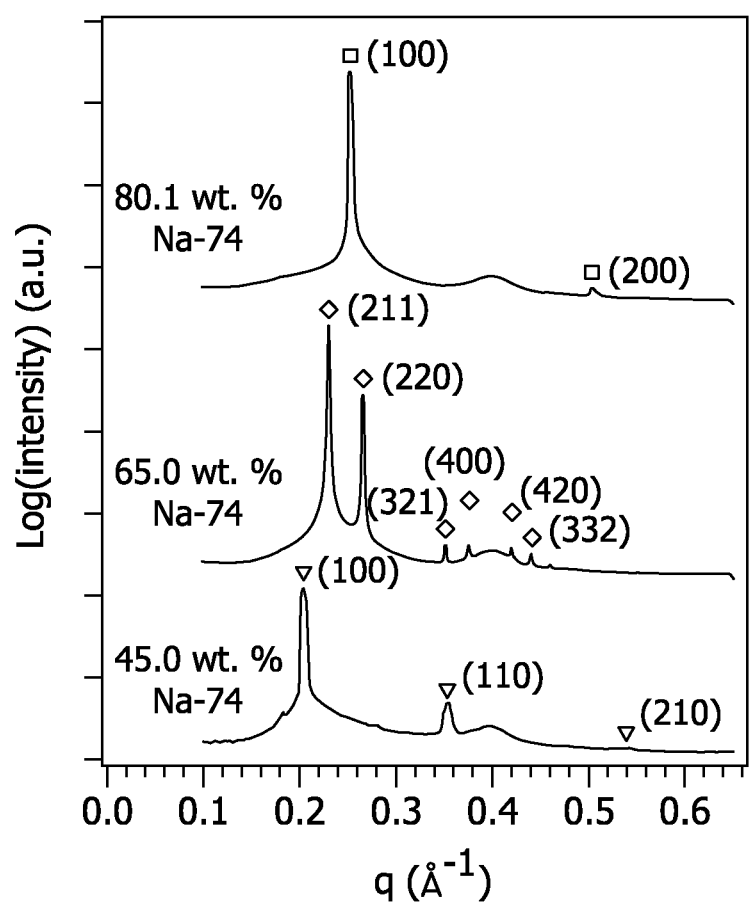
FIG. 3 is a graph depicting azimuthally integrated XRD patterns of NA-74 LLCs with various water contents at 25° C. Markers on each trace indicate calculated positions for Bragg reflections of the $H_I$ (▼), $G_I$ (♦), and $L_\alpha$ (■) morphologies. The broad low intensity peak at ~0.4 Å$^{-1}$ is an artifact due to the Kapton windows of the XRD sample holder.

Hydration of these gemini surfactants with varying amounts of water yields well-ordered LLC assemblies having viscous, gel-like properties over a concentration range from 25-90 wt % amphiphile. The LLC phase behavior of these surfactants was interrogated by variable temperature synchrotron X-ray diffraction (XRD) over a temperature range 25-100° C. for samples having $H_2O$ contents varying in 5 wt % increments. Initial LLC phase behavior studies revealed that samples comprised of 80 wt % Na-74 and 20 wt % $H_2O$ form an optically birefringent $L_\alpha$-phase at 25° C.), whereas samples with lower $H_2O$ contents formed mixtures of crystalline gemini surfactant and LLC phases. A representative scattering pattern for this lamellar phase is shown in FIG. 3. Samples having 60-70 wt % Na-74 exhibit distinctive XRD patterns with prominent scattering maxima at q*√6, q*√8 with a characteristic ~10:1 intensity ratio, and weaker peaks at q*√14, q*√16, q*√20, q*√22 corresponding to the (211), (220), (321), (400), (420), and (332) reflections of a G-phase LLC with a cubic unit cell dimension of ~70 Å. SEE FIG. 3.

Figure 4:
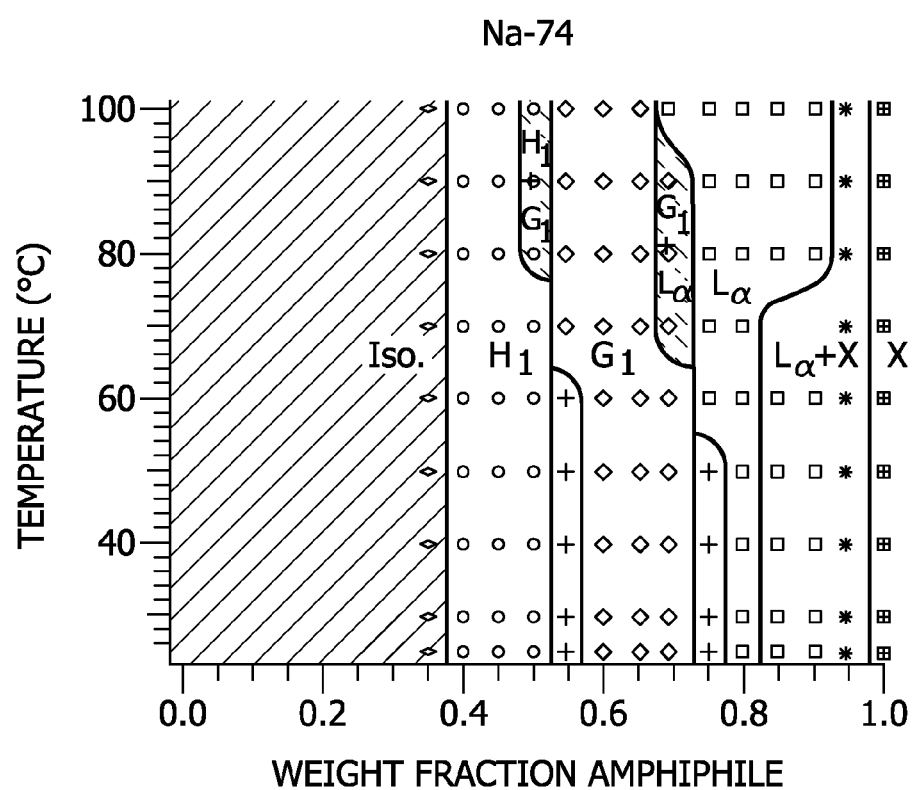
FIG. 4 is a temperature v. concentration LLC phase diagram for hydrated sodium carboxylate Gemini surfactant Na-74. Iso=fluid isotropic phase, $H_I$=normal hexagonal, $G_I$=normal Double Gyroid, $L_\alpha$=Lamellar, X=crystalline, and +=unknown LLC phase.

The lack of observed optical birefringence upon examining this sample between crossed polarizers at 22° C. is consistent with the cubic symmetry of this LLC phase. Since this G-phase window is situated at higher hydration levels than the L phase, it was assigned as a Type I ("normal") $G_I$-phase having interfacial curvature toward the hydrophobic domains. See Menger, F. M.; Keiper, J. S. Angew. Chem. Int. Ed. 2000, 39, 1906. Examination of samples having 40-50 wt % Na-74 indicate the formation of a "normal" hexagonal ($H_I$) phase with a modest degree of long-range order, evidenced by XRD peaks that index as q*√1, q*√3, and q*√7 with a ~34 Å intercylinder spacing. From the complete temperature-dependent aqueous lyotropic phase diagram for Na-74 shown in FIG. 4, one sees that these ordered LLC phases persist up to 100° C.

Figure 5:
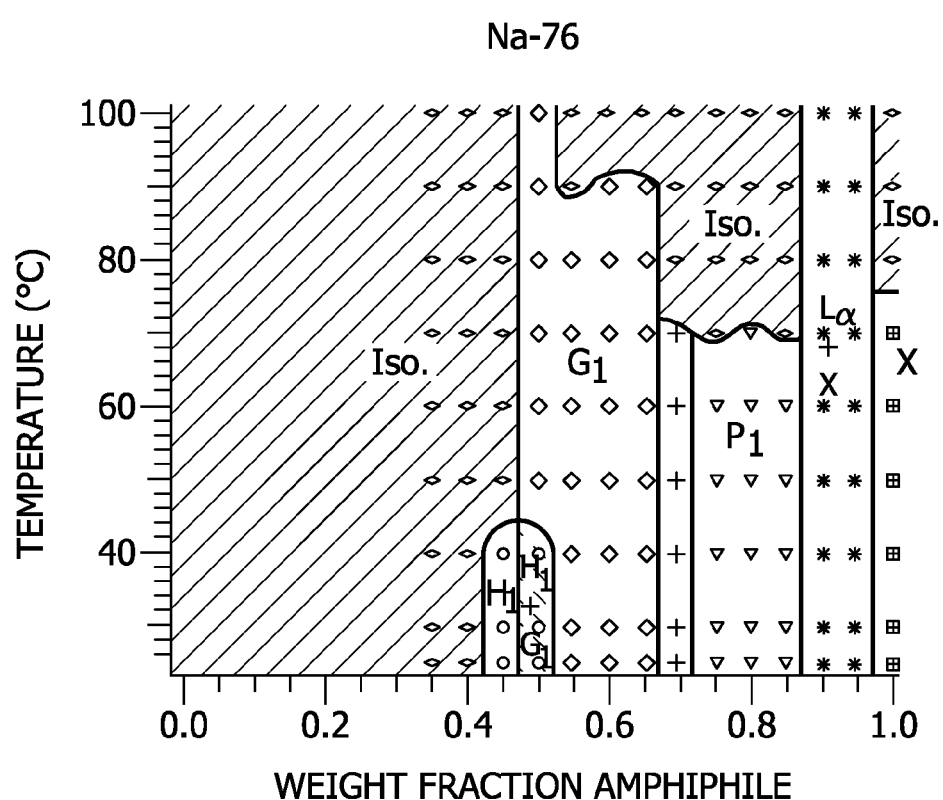
FIG. 5 is a temperature v. concentration LLC phase diagram for hydrated sodium carboxylate Gemini surfactant Na-76. Iso=fluid isotropic phase, $H_I$=normal hexagonal, $G_I$=normal Double Gyroid, $L_\alpha$=Lamellar, $P_I$=normal primitive, X=crystalline, and +=unknown LLC phase.

Upon increasing the length of the alkyl spacer between the carboxylate headgroups in the decanoic acid-derived Gemini surfactant as in Na-76, a large double gyroid phase window is observed in the midst of a different sequence of LLC phases upon hydration with >15 wt % $H_2O$, See FIG. 5. For samples hydrated in the range 75-85 wt % Na-76, stiff, optically non-birefringent gels characteristic of a Q-phase LLC formed with order-to-disorder ("clearing") temperatures ~70° C. Synchrotron XRD patterns exhibit prominent scattering maxima at q*√2, q*√6, q*√8, and q*√10, consistent with either a single gyroid structure ($Q^{214}$ space group symmetry) or a primitive (P) structure with a q*√4 extinction, which is comprised of a network of octahedral connectors ($Q^{229}$). See Hentz, et al., Macromolecules 1999, 32, 5803. In accord with convention, the higher symmetry structure was tentatively assigned this cubic phase as a $P_I$-phase. Samples comprised of ~70 wt % Na-76 form stiff yet birefringent gels, which exhibit unusual X-ray scattering patterns that cannot be assigned to any of the classical LLC morphologies. Between ~50-65 wt % amphiphile, Na-76 unequivocally forms a $G_I$-phase. Thus Na-76 adopts double gyroid morphology with saddle curvature at substantially higher hydration levels than Na-74. By comparing XRD data for LLCs comprised of hydrated Na-74 and Na-76 at comparable water contents that adopt the same morphologies, the unit cell dimensions do not vary significantly in spite of the difference in spacer lengths.

Figure 1C:
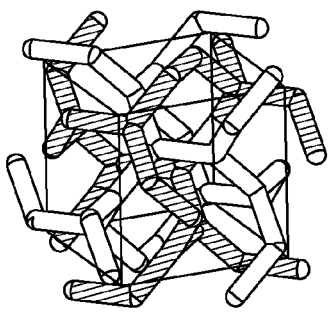
Figure 1D:
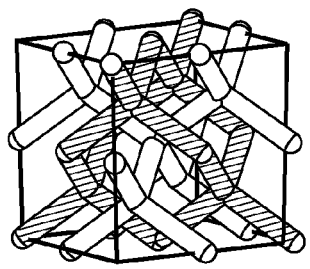
Figure 1E:
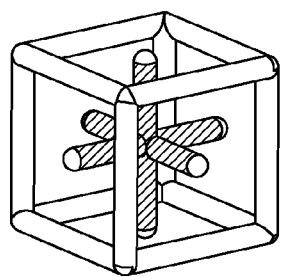
Figure 1F:
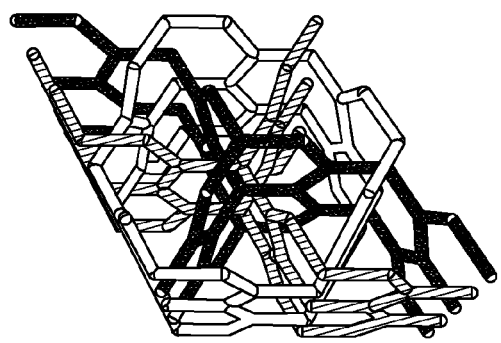

The flexible, hydrophobic spacer connecting the ionic headgroups in the anionic Gemini surfactants of the present disclosure confers a degree of conformational flexibility that enables it to accommodate the substantial deviations from constant mean interfacial curvature required for G-phase stabilization (FIG. 1C). Additionally, counterion association with the carboxylate headgroup or protonation of the carboxylates (with attendant formation of hydroxide ions in the aqueous domains) can mitigate Coulombic repulsions between headgroups. Effective charge neutralization through one of these mechanisms allows the alkyl spacer between the carboxylate headgroups to relax, enabling the Gemini amphiphile to adopt a wider range of interfacial curvatures over a broader range of headgroup hydration levels to stabilize the non-constant mean curvature $G_I$-phase. The flexible spacer likely also pulls away from the aqueous interface to mitigate unfavorable hydrophobic/hydrophilic interactions, inducing alkyl tail chain splay that favors $G_1$-phase formation (FIG. 2). Lengthening the $C_4$-spacer to a $C_6$-spacer enhances the conformational flexibility of the surfactant and widens the $G_I$-phase window (FIG. 3), while also inducing a high degree of chain splay (greater hydrophobic volume) that permits the formation of a $P_I$-phase at low hydration levels (FIG. 2). Given that the curvature of a surface displaying densely packed carboxylic acids is known to affect the $pK_a$ of the acid functionality, the possibility for variable protonation states of the gemini carboxylate headgroups may also play an important role in stabilizing the observed $G_I$-phases. See Gao et al., Chem. Eur. J. 2008, 14, 11423.

Figure 6:
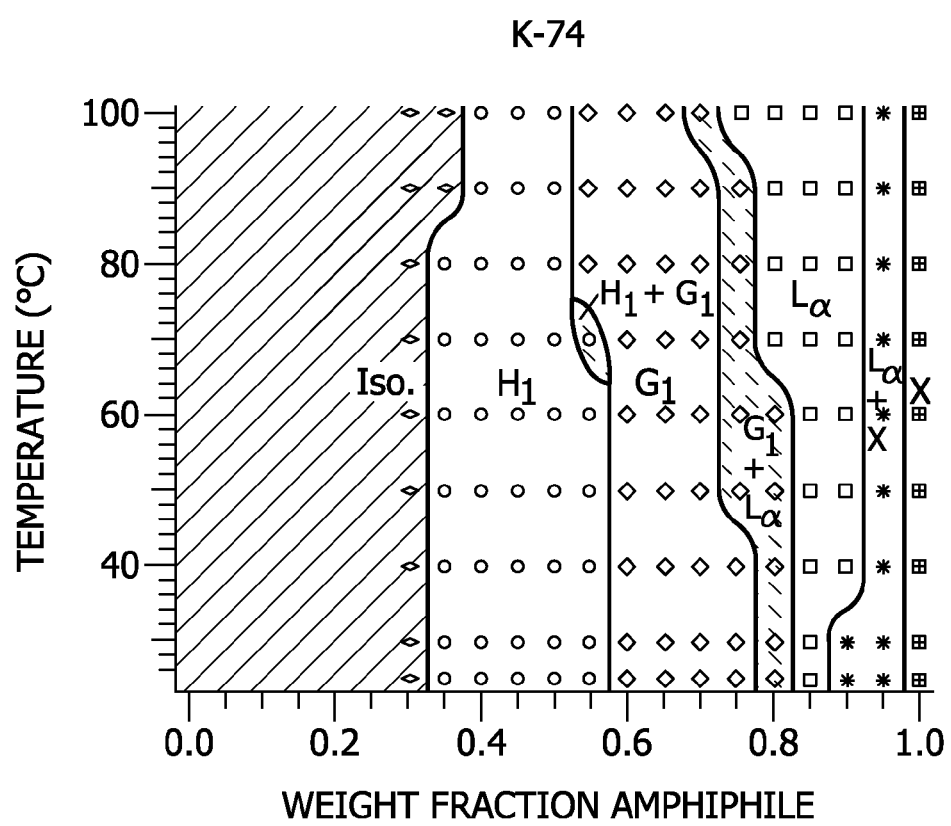
FIG. 6 is a phase diagram for hydrated potassium carboxylate Gemini surfactant K-74. Iso=fluid isotropic phase, $H_I$=normal hexagonal, $G_I$=normal Double Gyroid, $L_\alpha$=Lamellar, X=crystalline.
Figure 7:
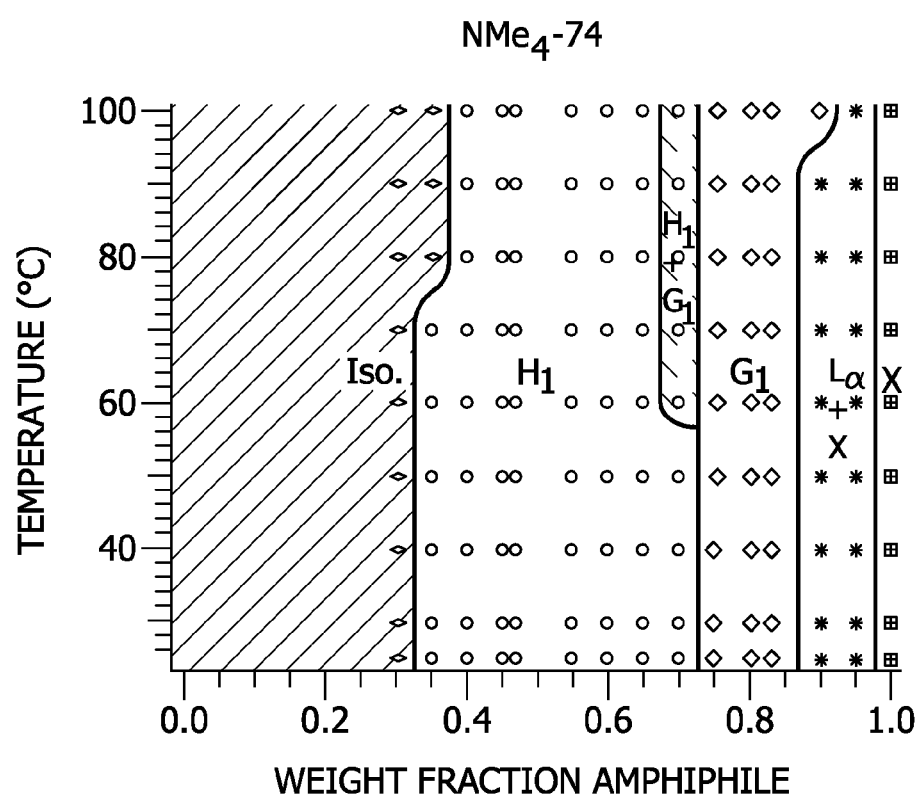
FIG. 7 is a phase diagram for hydrated tetramethylammonium carboxylate Gemini surfactant NMe4-74. Iso=fluid isotropic phase, $H_I$=normal hexagonal, $G_I$=normal Double Gyroid, $L_\alpha$=Lamellar, X=crystalline.

Variable temperature XRD studies of the phase behavior of K-74 indicate that the $H_I$ phase window widens substantially and that the $G_I$ window widens and shifts to lower $H_2O$ contents as compared to sodium analog Na-74. The LLC phase diagram for NMe4-74 shows an even more pronounced widening of the $H_I$ phase composition window and a large shift in the $G_I$ phase toward lower hydration levels, such that $L_\alpha$ phase completely vanishes. See FIGS. 6 and 7.

Figure 8:
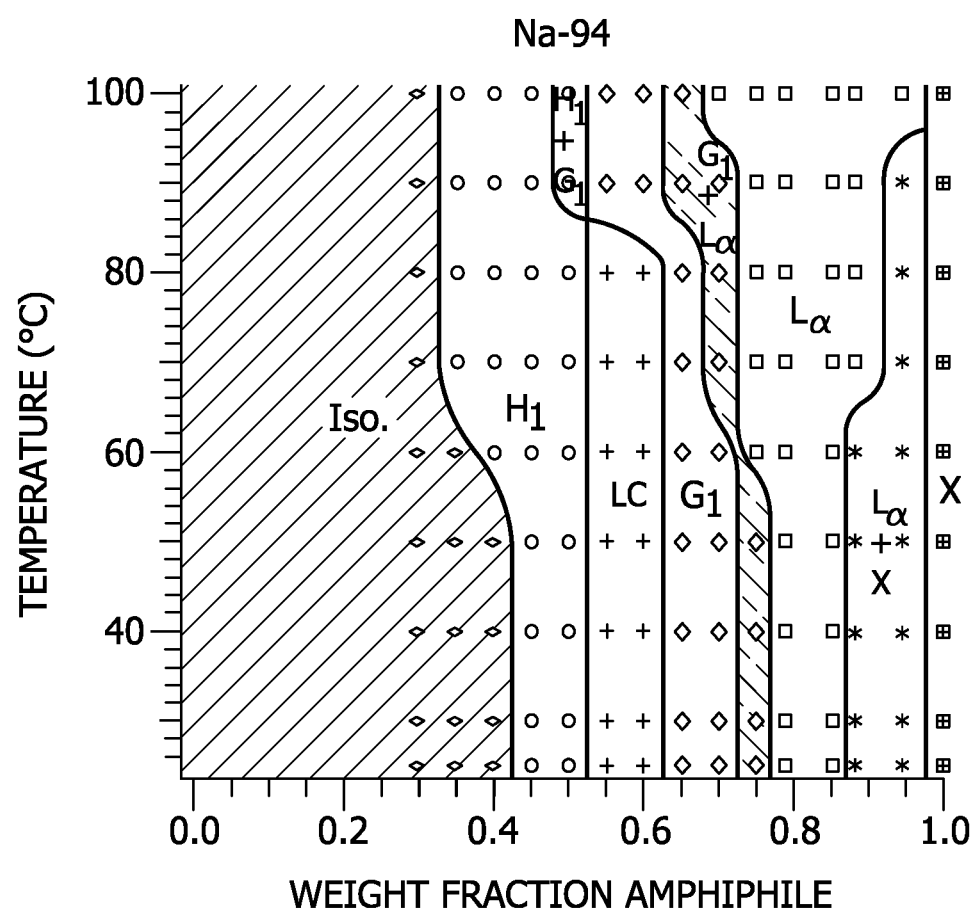
FIG. 8 is a phase diagram for hydrated sodium carboxylate Gemini surfactant Na-94. Iso=fluid isotropic phase, $H_I$=normal hexagonal, LC=normal tetracontinuous hexagonal, $G_I$=normal Double Gyroid, $L_\alpha$=Lamellar, X=crystalline.

The phase behavior of Na-94 (hexacosane-11,16-dicarboxylaic acid disodium salt) was also observed. See FIG. 8. Na-94 exhibits a transition into the normal hexagonal ($H_I$ in FIG. 8) at about 40 wt % surfactant in water and another transition to form the hexagonal tetracontinuous phase (LC in FIG. 8) at about 50-60 wt % surfactant in water, which is followed by a transition into the normal double gyroid ($G_I$) phase.

Comparisons of the principal domain spacings for both the $G_I$ and $H_I$-phases at comparable hydration levels (λ=(mol $H_2O$)/(mol Gemini)) indicate that the LLC unit cell dimensions are relatively constant at ~34 Å for $H_I$ phases and ~66 Å for $G_I$ phases with different counterions. See Table 1. These findings demonstrate that increased counterion dissociation favors the formation of LLCs with high curvature interfaces at constant water content, although the counterion size does not substantially alter the unit cell dimensions of the LLC at similar values of 2. Therefore, changing surfactant counterion provides a simple means of manipulating LLC phase stability in these Gemini surfactant liquid crystals.

TABLE 1

| Sample | Phase | Weight percent | $\lambda^a$ | $d^b$ (nm) |
|---|---|---|---|---|
| Na-74 | $H_I$ | 50.1 | 24.5 | 3.38 |
| | $G_I$ | 69.3 | 10.9 | 6.58 |
| K-74 | $H_I$ | 54.9 | 21.6 | 3.37 |
| | $G_I$ | 69.9 | 11.3 | 6.58 |
| NMe4-74 | $H_I$ | 55.0 | 24.7 | 3.44 |
| | $G_I$ | 75.2 | 9.98 | 6.55 |

[a] λ = mol. $H_2O$/mol. Surfactant.
[b] Unit cell dimensions (d) were calculated from the position of the principle scattering maxima in azimuthally integrated XRD patterns; calculated values are estimates within ± 0.15 nm.

According to empirical results to date, the lyotropic liquid crystal comprising anionic surfactants having any of structures (I), (II), and (III), wherein M comprises a sodium ion generally exhibit a hexagonal phase at concentrations between 30 weight percent and about 50 weight percent, a bicontinuous cubic phase (Q-phase) at concentrations between about 45 weight percent and about 70 weight percent, and a lamellar phase at concentrations between about 65 weight percent and about 95 weight percent. When M is the potassium ion, the lyotropic liquid crystal generally exhibits a hexagonal phase at concentrations between 30 weight percent and about 60 weight percent, a bicontinuous cubic phase (Q-phase) at concentrations between about 55 weight percent and about 85 weight percent, and a lamellar phase at concentrations between about 80 weight percent and about 95 weight percent. When M is the tetramethylammonium ion, the lyotropic liquid generally exhibits a hexagonal phase at concentrations between 30 weight percent and about 80 weight percent, and a bicontinuous cubic phase (Q-phase) at concentrations between about 75 weight percent and about 95 weight percent. The stated concentrations ranges are general and may vary depending upon the identity of the aliphatic tails and connecting groups.

The counterion-dependent self-assembly of anionic Gemini dicarboxylate surfactant in water may be rationalized by considering the level of cation dissociation from the anionic carboxylate headgroup. Consistent with Hofmeister series trends, Brun et al. have shown that the association of cations with single tail alkyl carboxylates in dilute solutions increases in the order $(CH_3)_4N^+ < K^+ < Na^+$. See Brun, T. S., et al., *J. Colloid Interface Sci.* 1978, 63, 590. In the case of the counterions that strongly associate with the carboxylate headgroups, cation association with the interface reduces the repulsive Coulombic interactions between the headgroups to stabilize the $G_I$-phase over a large concentration window. Since the $(CH_3)_4N^+$ cation is highly dissociated, the lack of charge screening causes the alkyl spacer to extend in a manner that accommodates only very small deviations from constant mean curvature. Therefore, the $G_I$-phase window shrinks in size at the expense of the more stable $H_I$-phase.

The anionic Gemini dicarboxylate surfactant may be prepared by contacting a carboxylic acid with at least two equivalents of a sufficiently strong base capable of deprotonating the alpha carbon of the carboxylic acid. Deprotonation of the alpha carbon of the carboxylic acid yields a carbanion that is reactive with compound comprising leaving groups. Suitable bases include alkyl lithiums, alkylmagnesium reagents, lithium diisopropylamide, lithium tetramethylpiperidine, dialkyamide base, sodium hydride, and potassium hydride, among other suitable strong bases. The reaction suitably occurs in aprotic solvent, e.g., tetrahydrofuran, diethyl ether, any alkane solvent, any aromatic solvent, alkylamine solvents, alkyl diamine solvents, alkyl phosphoramide solvents.

Figure 9:
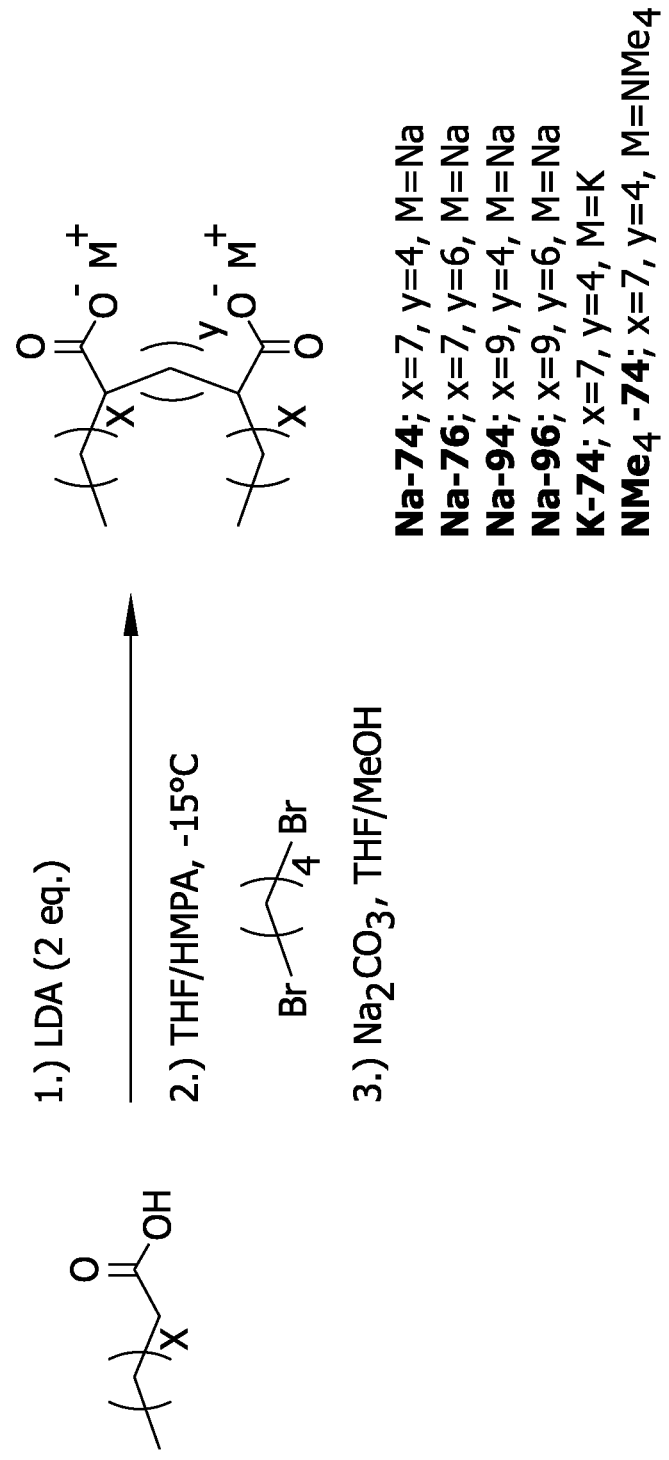
FIG. 9 is a depiction of the synthesis of anionic Gemini dicarboxylate surfactants.

The carboxylate compound containing the reactive carbanion is then contacted with a compound comprising the Y moiety terminated with leaving groups, which may be depicted:

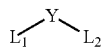

wherein $L_1$ and $L_2$ comprise leaving groups, Y comprises a connecting moiety. The molar ratio is generally about 2 moles deprotonated carboxylate to 1 mole compound containing the Y moiety. Appropriate leaving groups include bromide, iodide, chloride, tosylate, mesylate, triflate, and benzenesulfonate and p-toluenesulfonate. This contact thereby yields an Gemini dicarboxylate salt, e.g., a lithium Gemini dicarboxylate if an lithium reagent is used to deprotonate the alpha carbon. Upon workup and isolation, this yields a dicarboxylic acid. This dicarboxylic acid may be deprotonated with a base (e.g., sodium hydroxide, potassium hydroxide, ammonium hydroxide, tetramethylammonium hydroxide, etc.) to thereby prepare a variety of Gemini dicarboxylates with a desired charge balancing counterion. A general synthesis may be illustrated as shown in FIG. 9.

The following examples illustrate specific embodiments with the scope of the present disclosure. The examples are provided for the purpose of illustration and are not to be construed as limitations of the present disclosure.

EXPERIMENTAL

Materials.

All materials and reagent grade solvents were purchased from Sigma-Aldrich Chemical Co. (Milwaukee, Wis.) and used as received unless otherwise noted. 1,4-dibromobutane and 1,6-dibromohexane were distilled and stored under nitrogen. Diisopropylamine (Sigma-Aldrich) was distilled from $CaH_2$ and stored under nitrogen. Hexamethylphosphoramide (HMPA) was distilled from $CaH_2$ and stored over 4 Å molecular sieves. 2.5 M n-Butyllithium in hexanes was titrated against diphenylacetic acid in THF. Anhydrous and anaerobic THF was obtained by sparging analytical grade solvent with nitrogen for 30 minutes followed by cycling through a column of activated alumina in a Vacuum Atmospheres Solvent purification system.

$^1$H NMR and $^{13}$C NMR spectra were recorded in DMSO-$d_6$ or methanol-$d_4$ at 25° C. on both Varian MercuryPlus 300 and Bruker AC+300 spectrometers and were referenced to residual protiated solvent peaks in the samples.

Mass Spectrometry was performed using a Waters (Micromass) LCT® electrospray ionization time-of-flight mass spectrometer operating in negative ion detection mode. Samples dissolved in methanol were sprayed with a sample cone voltage of 20 V.

General Gemini Surfactant Synthesis. We employed a procedure adapted from Pfeffer et al. See Pfeffer, P. E.; Silbert, L. S.; Chirinko, J. M. *J Org Chem* 1972, 37, 451. A 500 mL 2-necked round bottom flask fitted with an addition funnel was charged with a stirbar, THF (104 mL) and diisopropylamine (17.05 mL, 121 mmol) under nitrogen. This solution was cooled to −15° C. in an ethanol/water/dry ice bath and n-BuLi (42.7 mL of a 2.71 M solution in hexanes, 115 mmol) was added dropwise via addition funnel. The reaction mixture was stirred for 30 min, after which a solution of decanoic acid (10.0027 g, 58.07 mmol) in THF (58 mL) was added dropwise via addition funnel. HMPA (10.1 mL) was the added, and the stirred reaction mixture was warmed to 22° C. for 30 min. The reaction mixture was again cooled to −15° C., and 1,4-dibromobutane (3.45 mL, 29.0 mmol) was added dropwise. The reaction was then allowed to warm to room temperature and stirred for 4 h. The reaction was quenched by the addition of cold 10% HCl (aq) (100 mL), transferred to a separatory funnel, and the aqueous and organic layers were separated. The aqueous layer was extracted with ether (3×50 mL) and the combined organic layers were washed with 10% HCl (3×50 mL), water (50 mL), and saturated NaCl(aq) (50 mL). After drying over MgSO4(s), all volatiles were removed under vacuum. The crude solid was purified by recrystallization from EtOH.

Docosane-9,14-dicarboxylic acid

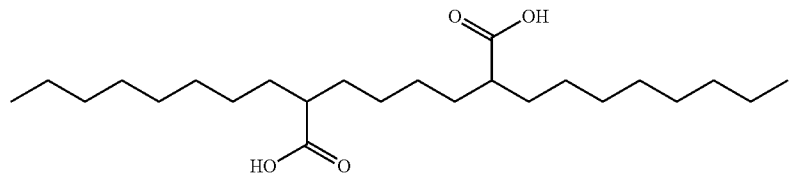 [SMILES: CCCCCCCCC(CCCCC(CCCCCCCC)C(=O)O)C(=O)O]

Synthesized from decanoic acid (10.0027 g) and 1,4-dibromobutane (3.45 ml); Yield: 9.2816 g (80.4%); $^1$H-NMR: (299.7 MHz, DMSO-$d_6$) δ 11.968 (COOH, s, 2H), 2.158 (CH—COOH, m, 2H), 1.557-1.018 (CH$_2$, m, 36H), 0.849 (CH$_2$-CH$_3$, t, J=7.0 Hz, 6H). $^{13}$C-NMR: (75.4 MHz, DMSO-$d_6$) δ 177.32 (C=O), 45.18 (CH), 32.21 (CH$_2$), 32.09 (CH$_2$), 31.67 (CH$_2$), 29.37 (CH$_2$), 29.26 (CH$_2$), 29.04 (CH$_2$), 27.25 (CH$_2$), 27.20 (CH$_2$), 22.48 (CH$_2$), 14.30 (CH$_3$). MS (ESI-TOF) calcd. m/z for $C_{24}H_{45}O_4^-$ 397.3, found: 397.4.

Tetracosane-9,16-dicarboxylic acid

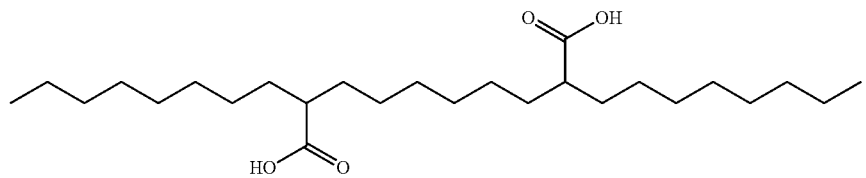 [SMILES: CCCCCCCCC(CCCCCCC(CCCCCCCC)C(=O)O)C(=O)O]

Synthesized from decanoic acid (10.0021 g) and 1,6-dibromohexane (4.42 ml); Yield: 8.3526 g (68.2%); $^1$H-NMR (299.7 MHz, DMSO-$d_6$): δ 11.951 (COOH, s, 2H), 2.160 (CH—COOH, m, 2H), 1.557-1.082 (CH$_2$, m, 40H), 0.847 (CH$_2$-CH$_3$, t, J=7.0 Hz, 6H). $^{13}$C-NMR (75.4 MHz, DMSO-$d_6$): δ 177.34 (C=O), 45.26 (CH), 32.25 (CH$_2$×2), 31.68 (CH$_2$), 29.39 (CH$_2$), 29.27 (CH$_2$), 29.04 (CH$_2$), 27.27 (CH$_2$), 27.21 (CH$_2$), 22.49 (CH$_2$), 14.28 (CH$_3$). MS (ESI-TOF) calcd. m/z for $C_{26}H_{49}O_4^-$ 425.4. found: 425.4

General Procedure for Gemini Dicarboxylate Salt Synthesis. See Hoag, B. P.; Gin, D. L. *Macromolecules* 2000, 33, 8549. In a flask equipped with a stirbar, the Gemini diacid (1 mol eq.) and alkali carbonate were suspended in methanol (0.1-0.2M). The mixture was stirred at ambient temperature until it became homogeneous, and then stirring was continued for one additional hour. All volatiles were removed under vacuum and residual water and methanol azeotropically distilled using benzene three times under vacuum. All yields were quantitative.

Sodium Docosane-9,14-dicarboxylate (Na-74)

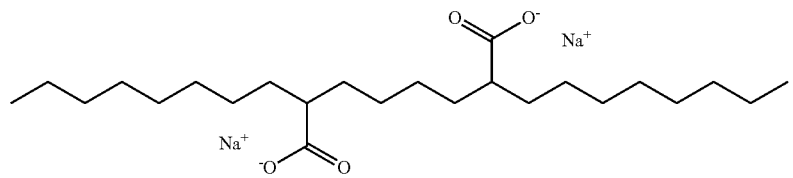

$^1$H-NMR (299.7 MHz, CD$_3$OD): δ 2.144 (CH—COO—, m, 2H), 1.529 (CH—CH$_2$, m, 4H), 1.431-1.158 (CH$_2$, m, 32H), 0.889 (CH$_2$-CH$_3$, t, J=7.1 Hz, 6H). $^{13}$C-NMR (75.4 MHz, CD$_3$OD): δ 184.09 (C=O), 49.49 (CH), 33.41 (CH$_2$), 33.26 (CH$_2$), 31.60 (CH$_2$), 29.59 (CH$_2$), 29.30 (CH$_2$), 28.99 (CH$_2$), 28.19 (CH$_2$), 27.70 (CH$_2$), 22.24 (CH$_2$), 12.96 (CH$_3$);

Potassium Docosane-9,14-dicarboxylate (K-74)

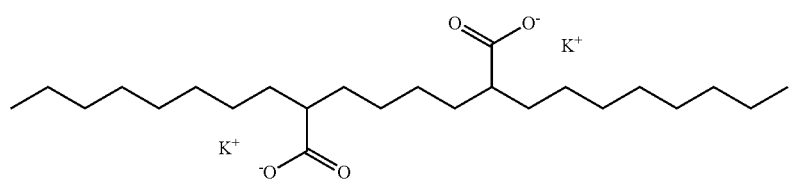

¹H-NMR (299.7 MHz, CD₃OD): δ 2.141 (CH—COO—, m, 2H), 1.526 (CH—CH₂, m, 4H), 1.427-1.160 (CH₂, m, 32H), 0.890 (CH₂—CH₃, t, J=7.1 Hz, 6H). ¹³C-NMR (75.4 MHz, CD₃OD): δ 184.02 (C=O), 49.50 (CH), 33.40 (CH₂), 33.28 (CH₂), 31.60 (CH₂), 29.59 (CH₂), 29.29 (CH₂), 28.99 (CH₂), 28.19 (CH₂), 27.70 (CH₂), 22.25 (CH₂), 12.95 (CH₃).

Synthesized from dodecanoic acid (10.0102 g) and 1,4-dibromobutane (2.90 ml); Yield: 9.2849 g (83.8%); ¹H-NMR: (299.7 MHz, DMSO-d₆) δ 11.964 (COOH, s, 2H), 2.154 (CH—COOH, m, 2H), 1.557-1.082 (CH₂, m, 44H), 0.848 (CH₂-CH₃, t, J=7.0 Hz, 6H); ¹³C-NMR: (75.4 MHz, DMSO-d₆) δ 177.29 (C=O), 45.14 (CH), 32.21 (CH₂), 32.17 (CH₂), 32.04 (CH₂), 31.72 (CH₂), 29.39 (CH₂), 29.31 (CH₂), 29.13 (CH₂), 27.24 (CH₂), 27.18 (CH₂), 22.50 (CH₂), 14.28 (CH₃); MS (ESI-TOF) calc. m/z for $C_{28}H_{53}O_4^-$ 453.4. found 453.4.

Tetramethylammonium Docosane-9,14-dicarboxylate (NMe4-74)

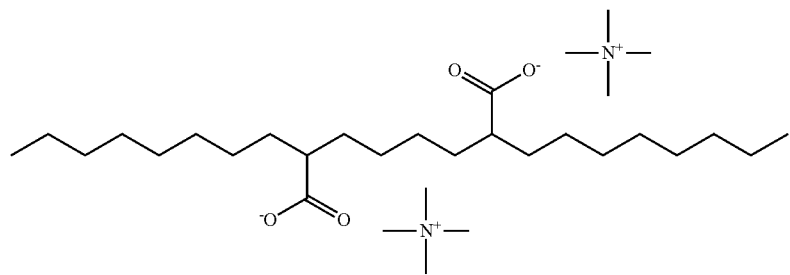

¹H-NMR (299.7 MHz, CD₃OD): δ 3.194 (s, 24H), 2.143 (CH—COO—, m, 2H), 1.532 (CH—CH₂, m, 4H), 1.432-1.148 (CH₂, m, 32H), 0.891 (CH₂-CH₃, t, J=7.1 Hz, 6H). ¹³C-NMR (75.4 MHz, CD₃OD): δ 183.82 (C=O), 54.39 (⁺N(CH₃)₄), 49.56 (CH), 33.46 (CH₂), 33.27 (CH₂), 31.60 (CH₂), 29.61 (CH₂), 29.31 (CH₂), 29.00 (CH₂), 28.28 (CH₂), 27.73 (CH₂), 22.25 (CH₂), 12.96 (CH₃).

Sodium Tetracosane-9,16-dicarboxylate (Na-76)

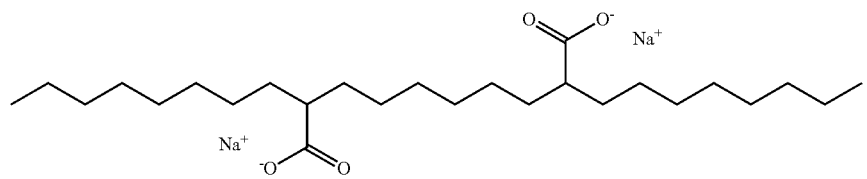

¹H-NMR (299.7 MHz, CD₃OD): δ 2.148 (CH—COO—, m, 2H), 1.519 (CH—CH₂, m, 4H), 1.423-1.150 (CH₂, m, 36H), 0.891 (CH₂-CH₃, t, J=7.1 Hz, 6H). ¹³C-NMR (75.4 MHz, CD₃OD): δ 184.08 (C=O), 49.39 (CH), 33.40 (CH₂), 33.29 (CH₂), 31.60 (CH₂), 29.73 (CH₂), 29.58 (CH₂), 29.29 (CH₂), 28.99 (CH₂), 27.83 (CH₂), 27.70 (CH₂), 22.24 (CH₂), 12.94 (CH₃).

Hexacosane-11,16-dicarboxylic acid

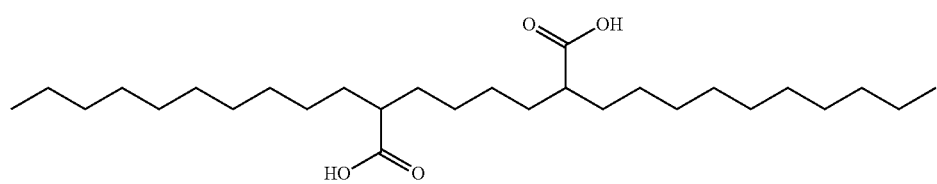 [SMILES: CCCCCCCCCCC(CCCCC(CCCCCCCCCC)C(=O)O)C(=O)O]

Octacosane-11,18-dicarboxylic acid

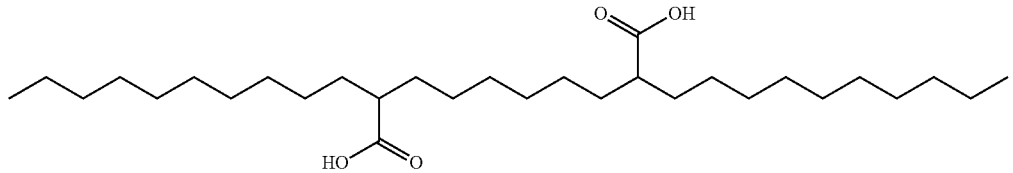 [SMILES: CCCCCCCCCCC(CCCCCCC(CCCCCCCCCC)C(=O)O)C(=O)O]

Synthesized from dodecanoic acid (8.0060 g) and 1,6-dibromohexane (3.05 ml); Yield: 7.0712 g (73.9%); $^1$H-NMR: (299.9 MHz, DMSO-$d_6$) δ 12.003 (COOH, s, 2H), 2.159 (CH—COOH, m, 2H), 1.550-1.096 (CH$_2$, m, 48H), 0.848 (CH$_2$-CH$_3$, t, J=6.9 Hz, 6H); $^{13}$C-NMR: (75.4 MHz, DMSO-$d_6$ δ 177.50 (C=O), 45.31 (CH), 32.31 (CH$_2$), 31.80 (CH$_2$), 29.47 (CH$_2$), 29.38 (CH$_2$), 29.28 (CH$_2$), 29.21 (CH$_2$), 27.33 (CH$_2$), 27.28 (CH$_2$), 22.59 (CH$_2$), 14.42 (CH$_3$); MS (ESI-TOF) calcd m/z for $C_{30}H_{52}O_4^-$ 481.4. found 481.4.

Sodium Hexacosane-11,16-dicarboxylate

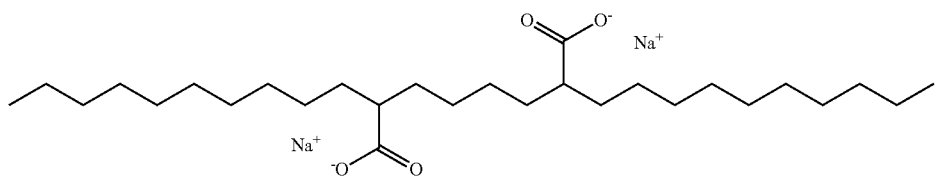

$^1$H-NMR: (299.7 MHz, CD$_3$OD-$d_4$) δ 2.144 (CH—COO$^-$, m, 2H), 1.531 (CH—CH$_2$, m, 4H), 1.434-1.134 (CH$_2$, m, 40H), 0.894 (CH$_2$-CH$_3$, t, J=7.0 Hz, 6H); $^{13}$C-NMR: (75.4 MHz CD$_3$OD-$d_4$) δ 184.08 (C=O), 49.49 (CH), 33.40 (CH$_2$), 33.25 (CH$_2$), 31.59 (CH$_2$), 29.59 (CH$_2$), 29.32 (CH$_2$× 2), 28.99 (CH$_2$), 28.08 (CH$_2$), 27.71 (CH$_2$), 22.25 (CH$_2$), 12.95 (CH$_3$); Anal. Calc.: $C_{28}H_{52}O_4Na_2$: C, 67.44; H, 10.51. Found: C, 67.02; H, 10.15.

Sodium Octacosane-11,18-dicarboxylate

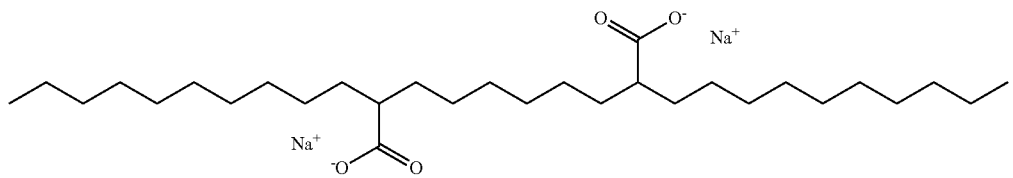

$^1$H-NMR: (299.7 MHz, CD$_3$OD-$d_4$) δ 2.147 (CH—COO$^-$, m, 2H), 1.520 (CH—CH$_2$, m, 4H), 1.418-1.123 (CH$_2$, m, 44H), 0.895 (CH$_2$-CH$_3$, t, J=7.0 Hz, 6H); $^{13}$C-NMR: (75.4 MHz CD$_3$OD-$d_4$) δ 184.06 (C=O), 49.38 (CH), 33.39 (CH$_2$), 33.28 (CH$_2$), 31.59 (CH$_2$), 29.72 (CH$_2$), 29.58 (CH$_2$), 29.31 (CH$_2$), 28.98 (CH$_2$), 27.84 (CH$_2$), 27.70 (CH$_2$), 22.24 (CH$_2$), 12.94 (CH$_2$).

Gemini LLC Sample Preparation. Aqueous lyotropic liquid crystal (LLC) samples were prepared for X-ray analysis by weighing appropriate amounts of Gemini salt and doubly distilled water into a vial and centrifuging the tightly capped mixture for 10 min, manual mixing using a spatula, and an additional 10 min of centrifugation. Post-centrifugation, the samples were allowed to rest at room temperature for at least 12 h before X-ray diffraction analysis. Samples were stored in tightly sealed vials whenever possible during sample preparation in order to minimize water loss through evaporation.

X-Ray Diffraction. Synchrotron small-angle X-ray scattering (SAXS) measurements were performed at the 12-ID-B beamline at the Advanced Photon Source (Argonne, Ill.). Experiments employed a beam energy of 12 keV (λ=1.034 Å) and a 2.550 m sample-to-detector distance, which was calibrated using a silver behenate standard sample with d=58.38 Å. Two-dimensional SAXS patterns were recorded on a Pilatus 2M detector (25.4 cm×28.9 cm rectangular area) with 1475×1679 pixel resolution. Samples were placed in aluminum DSC pans with Kapton windows and placed in a Linkam DSC stage. Samples were heated to the desired temperature in a Linkam DSC and allowed to equilibrate for 5 min before data collection (exposure time ~1 s). 2D patterns were azimuthally integrated to obtain intensity I(q) v. q plots using DataSqueeze software package (http://www.datasqueeze-software.com/).

Laboratory SAXS measurements were performed in the Materials Science Center at the University of Wisconsin-Madison. Cu—K$_α$ X-rays generated by a Rigaku Micromax 002+ microfocus source were collimated using a Max-Flux multilayer confocal optic (Osmic, Inc.) followed by passage through three pinholes to collimate and trim the final beam diameter to <0.5 mm. Samples were mounted in a vacuum chamber on a Linkam temperature-controlled hot-stage with a 10 min thermal equilibration time (typical exposure times ~3-5 min) Two-dimensional XRD patterns were recorded on a Gabriel X-ray detector (150 mm diameter active circular area) using a sample-to-detector distance of 31.19 cm (calibrated using a silver behenate standard sample with d=58.38 Å).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lyotropic liquid crystal composition comprising:
a polar solvent and an anionic Gemini surfactant, the anionic Gemini surfactant comprising at least one carboxylate moiety;
wherein the anionic Gemini surfactant forms a triply periodic phase over a range of concentrations from $C_i$ to $C_{ii}$ wherein the difference between $C_i$ and $C_{ii}$ is at least 10 weight percent and over a range of temperatures from $T_i$ to $T_{ii}$ wherein the difference between $T_i$ and $T_{ii}$ is at least 40° C.

2. The lyotropic liquid crystal composition of claim 1 wherein the difference between $C_i$ and $C_{ii}$ is at least 12 weight percent.

3. The lyotropic liquid crystal composition of claim 1 wherein the difference between $T_i$ and $T_{ii}$ is at least 45° C.

4. The lyotropic liquid crystal composition of claim 1 wherein the triply periodic phase comprises a gyroid phase (space group #230), a double diamond phase (space group #224), a primitive cubic phase (space group #229), or a tetracontinuous hexagonal phase (space group #193).

5. The lyotropic liquid crystal composition of claim 1 wherein the polar solvent is selected from the group consisting of water, acetone, tetrahydrofuran, diethyl ether, ethylene glycol, diethylene glycol, glycidol, 2-butene-1,4-diol, propanediol, glycerol, formamide, N-methylformamide, N,-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, ethanolammonium acetate, 1-ethyl-3-methyl-imidazolium acetate, 1-ethyl-3-methylimidazolium bis(trifluoromethylsulfonyl)imide, 1-ethyl-3-methylimidazolium tetrafluoroborate, and any combination thereof.

6. The lyotropic liquid crystal composition of claim 1 wherein the anionic Gemini surfactant is present at a concentration of at least 30 weight percent; and
the anionic Gemini surfactant is present at a concentration of no greater than 95 weight percent.

7. A lyotropic liquid crystal composition comprising a polar solvent and an anionic Gemini surfactant, the anionic Gemini surfactant comprising at least one carboxylate moiety;
wherein the anionic Gemini surfactant forms a triply periodic phase over a range of concentrations from $C_i$ to $C_{ii}$ wherein the difference between $C_i$ and $C_{ii}$ is at least 10 weight percent and over a range of temperatures from $T_i$ to $T_{ii}$ wherein the difference between $T_i$ and $T_{ii}$ is at least 40° C.
wherein the anionic Gemini surfactant has the following structure:

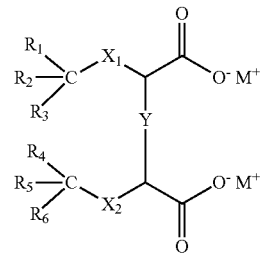

wherein $X_1$ and $X_2$ are each independently a substituted or unsubstituted aliphatic moiety having between four and 30 carbon atoms or a substituted or unsubstituted aryl-aliphatic moiety having between four and 30 carbon atoms;
Y is a connecting moiety;
M is a counterion; and
$R_1$ through $R_6$ are each independently selected from the group consisting of hydrogen, fluoride, chloride, and bromide.

8. The lyotropic liquid crystal composition of claim 7 wherein each M is selected from the group consisting of lithium ion; sodium ion; potassium ion; cesium ion; magnesium ion; calcium ion; zinc ion; ammonium ion; alkylammonium ion having the structure $H_xR_{4-x}N^+$ wherein x is an integer having a value of 0 through 4 and R is selected from the group consisting of methyl, ethyl, propyl, butyl, and combinations thereof; tetrakis(hydroxymethyl)phosphonium ion; tetramethylphosphonium ion; choline; imidazolium; bis(quaternary ammonium) ion; and combinations thereof.

9. The lyotropic liquid crystal composition of claim 7 wherein Y comprises an aliphatic moiety, which may be substituted or unsubstituted and may be branched or unbranched, the aliphatic moiety comprising between three carbon atoms and 20 carbon atoms.

10. A lyotropic liquid crystal composition comprising a polar solvent and an anionic Gemini surfactant, the anionic Gemini surfactant comprising at least one carboxylate moiety;
wherein the anionic Gemini surfactant forms a triply periodic phase over a range of concentrations from $C_i$ to $C_{ii}$ wherein the difference between $C_i$ and $C_{ii}$ is at least 10 weight percent and over a range of temperatures from $T_i$ to $T_{ii}$ wherein the difference between $T_i$ and $T_{ii}$ is at least 40° C.
wherein the anionic Gemini surfactant has the following structure:

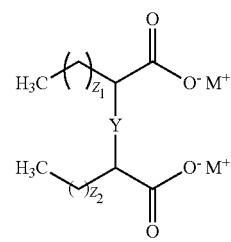

wherein $Z_1$ and $Z_2$ are integers, each independently having a value between four and 20;
Y is a connecting moiety; and
M is a counterion.

11. A lyotropic liquid crystal composition comprising:
a polar solvent at a concentration of at least 10 weight percent; and
an anionic Gemini surfactant at a concentration of least 30 weight percent, the anionic Gemini surfactant having the following structure:

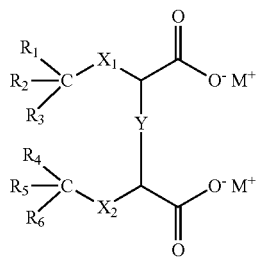

wherein $X_1$ and $X_2$ are each independently a substituted or unsubstituted aliphatic moiety having between four and 30 carbon atoms or a substituted or unsubstituted aryl-aliphatic moiety having between four and 30 carbon atoms;
Y is a connecting moiety selected from the group consisting of a branched or unbranched hydrocarbyl moiety, a substituted or unsubstituted aryl or heteroaryl moiety, and a hydrophilic moiety;
M is a counterion; and
$R_1$ through $R_6$ are each independently selected from the group consisting of hydrogen, fluoride, chloride, and bromide.

12. The lyotropic liquid crystal composition of claim 11 wherein the polar solvent is selected from the group consisting of water, acetone, tetrahydrofuran, diethyl ether, ethylene glycol, diethylene glycol, glycidol, 2-butene-1,4-diol, propanediol, glycerol, formamide, N-methylformamide, N,-ethylformamide, acetamide, N-methylacetamide, N-ethylacetamide, methanol, ethanol, propanol, ethylammonium nitrate, ethanolammonium nitrate, ethyl ammonium formate, ethanolammonium formate, ethylammonium acetate, ethanolammonium acetate, 1-ethyl-3-methyl-imidazolium acetate, 1-ethyl-3-methylimidazolium bis(trifluoromethylsulfonyl)imide, 1-ethyl-3-methylimidazolium tetrafluoroborate, and any combination thereof.

13. The lyotropic liquid crystal composition of claim 11 wherein each M is selected from the group consisting of lithium ion; sodium ion; potassium ion; cesium ion; magnesium ion; calcium ion; zinc ion; ammonium ion; alkylammonium ion having the structure $H_xR_{4-x}N^+$ wherein x is an integer having a value of 0 through 4 and R is selected from the group consisting of methyl, ethyl, propyl, butyl, and combinations thereof; tetrakis(hydroxymethyl)phosphonium ion; tetramethylphosphonium ion; choline; imidazolium; bis(quaternary ammonium) ion; and combinations thereof.

14. The lyotropic liquid crystal composition of claim 11 wherein Y comprises the substituted or unsubstituted aryl or heteroaryl moiety.

15. The lyotropic liquid crystal composition of claim 11 wherein Y comprises the hydrophilic moiety.

16. The lyotropic liquid crystal composition of claim 11 wherein the anionic Gemini surfactant has the following structure:

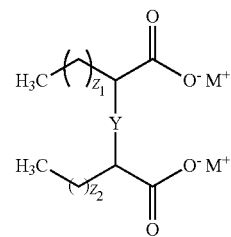

wherein $Z_1$ and $Z_2$ are integers, each independently having a value between four and twenty;
Y is the connecting moiety; and
M is the counterion.

* * * * *

UNITED STATES PATENT AND TRADEMARK OFFICE
CERTIFICATE OF CORRECTION

PATENT NO. : 8,834,743 B2
APPLICATION NO. : 13/472817
DATED : September 16, 2014
INVENTOR(S) : Mahesh Kalyana Mahanthappa et al.

It is certified that error appears in the above-identified patent and that said Letters Patent is hereby corrected as shown below:

In the Specification

In column 2, line 45, delete "least 30" and insert -- at least 30 --, therefor.

In column 4, line 50, delete "hexaganal" and insert -- hexagonal --, therefor.

In column 9, line 17, delete "$Y_i$" and insert -- $Y_1$ --, therefor.

In column 10, line 35-36, delete "N,-ethylformamide," and insert -- N-ethylformamide, --, therefor.

In column 11, line 59, delete "$G_1$-phase" and insert -- $G_I$-phase --, therefor.

In column 12, line 29, delete "2." and insert -- $\lambda$. --, therefor.

In column 13, line 4, delete "Hofineister" and insert -- Hofmeister --, therefor.

In column 13, line 26, delete "dialkyamide base," and insert -- dialkylamide base, --, therefor.

In the Claims

In column 21, line 40-41, in claim 5, delete "N,-ethylformamide," and insert -- N-ethylformamide, --, therefor.

In column 23, line 4, in claim 11, delete "least 30" and insert -- at least 30 --, therefor.

In column 23, line 37-38, in claim 12, delete "N,-ethylformamide," and insert -- N-ethylformamide, --, therefor.

Signed and Sealed this
Fifteenth Day of September, 2015

Michelle K. Lee
*Director of the United States Patent and Trademark Office*